F. H. CARROLL.
VEGETATION PROTECTING STRUCTURE.
APPLICATION FILED NOV. 11, 1919.
1,407,125. Patented Feb. 21, 1922.
2 SHEETS—SHEET 1.
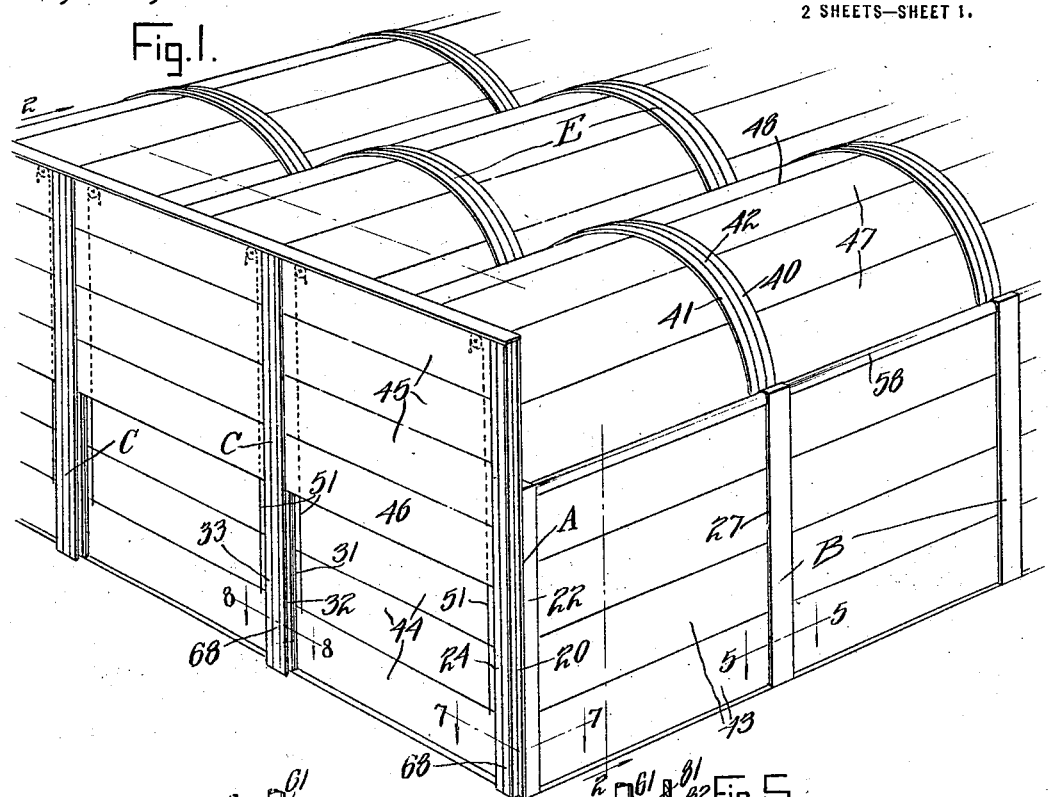
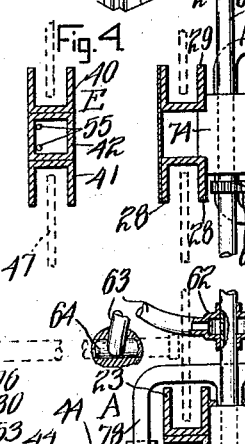
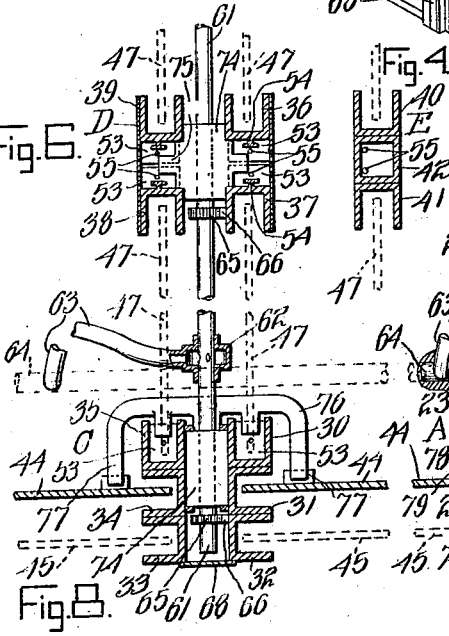
Inventor
Frank H. Carroll
By Bradford Morrill Biernan
Attorneys

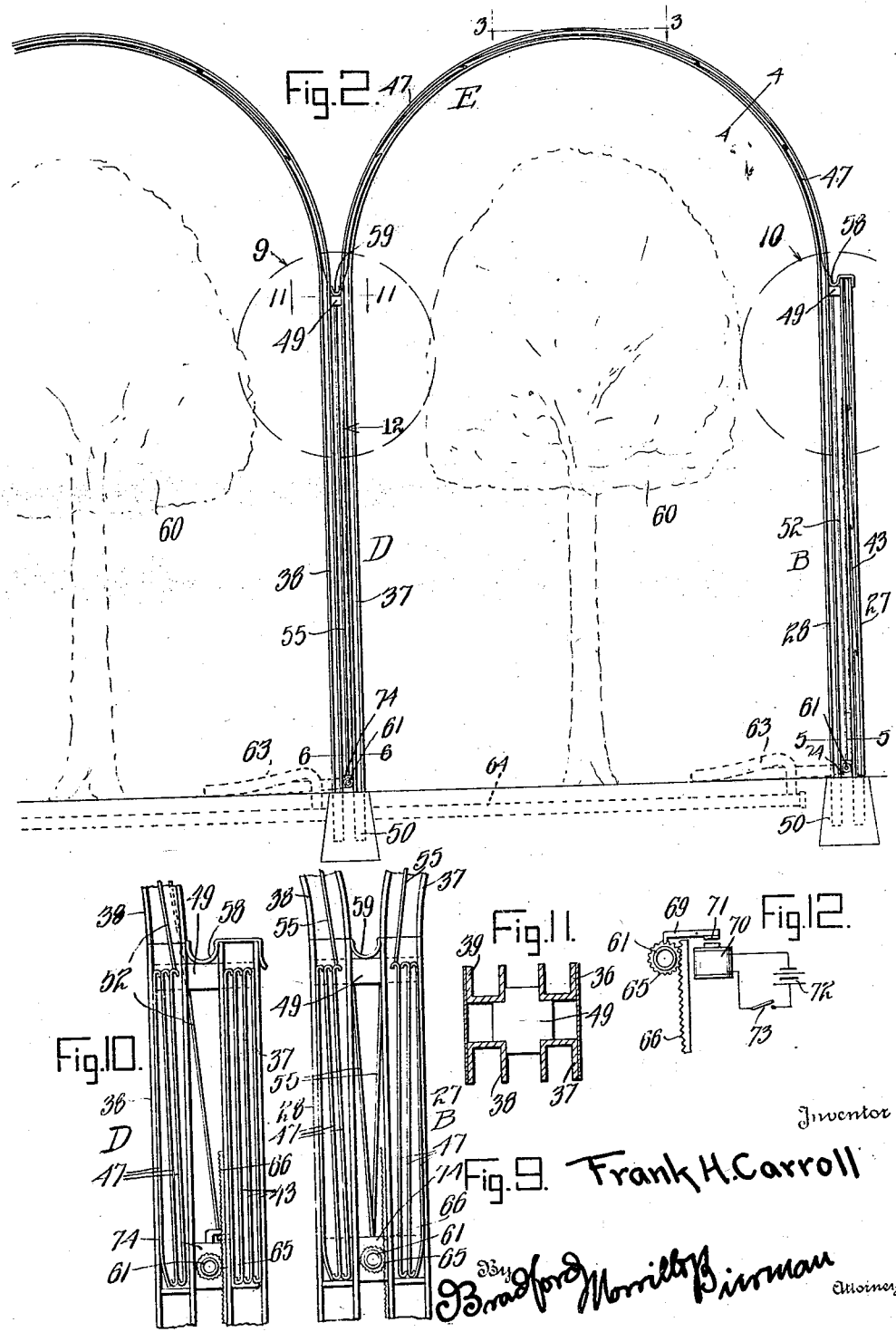

UNITED STATES PATENT OFFICE.

FRANK H. CARROLL, OF LOS ANGELES, CALIFORNIA.

VEGETATION-PROTECTING STRUCTURE.

1,407,125.  Specification of Letters Patent.  Patented Feb. 21, 1922.

Application filed November 11, 1919. Serial No. 337,339.

*To all whom it may concern:*

Be it known that I, FRANK H. CARROLL, a citizen of the United States, residing at Los Angeles, in the county of Los Angeles and State of California, have invented certain new and useful Improvements in Vegetation-Protecting Structures, of which the following is a specification.

This invention relates to building structures for protecting trees, plants and other vegetation from frost and the like, and has for an object to provide a structure embodying movable or slidable sections or shutter units which are closed when freezing weather is impending.

Another object of the invention is to provide in combination with a normally open, but closable, structure, improved means for heating or raising the temperature within the structure when closed.

With these and other objects in view, the device comprises certain novel constructions, units, combinations and arrangement of parts, as will be hereinafter more fully described and claimed.

Referring to the acompanying drawing, which is made a part hereof, and on which similar reference characters indicate similar parts, Figure 1 is a perspective view of one corner of a completed structure, showing several units with the shutter units closed, Figure 2 is transverse view of the same taken on line 2—2 of Figure 1, Figure 3 is a sectional view through the top of the arch structure, showing the pulleys and other means for raising and lowering the shutter units and taken on line 3—3 of Figure 2, Figure 4 is a sectional view through the arch structure as indicated by line 4—4 of Figure 2, Figure 5 is a transverse sectional view through one of the side posts as indicated by line 5—5 of Figures 1 and 2, Figure 6 is a transverse sectional view through one of the interior posts as indicated by line 6—6 of Figure 2, Figure 7 is a transverse sectional view of one of the corner posts as indicated by line 7—7 of Figure 1, Figure 8 is a transverse sectional view through one of the end posts as indicated by line 8—8 of Figure 1, Figure 9 is an enlarged fragmentary detail view of one of the interior posts where it joins with the arch members taken within the circle 9 of Figure 2, and showing the shutters in nested position, Figure 10 is an enlarged detail view of a fragment of one of the side posts taken within the arc 10 on Figure 2 showing the shutters nested, Figure 11 is a transverse sectional view taken on line 11—11 of Figure 2 showing the strengthening and spacing block, and Figure 12 is a detail view showing the detent and the electrical control for engaging and releasing the weight members positioned as indicated by arrow 12 in Figure 2.

The structure in its basic form comprises a plurality of posts which may be indicated as corner posts A, side posts B, end posts C, and interior posts D, with arch members E extending between the several posts.

Each of the several lettered members is made up of a plurality of parts, preferably of commercial structural metal fabricated to conform to the requirements of the particular unit.

The corner post A, for instance, comprises an angle bar 20 with a channel bar 21 secured thereto by any closing device as the plate 22. Spaced from the bars 20 and 21 are channel bars 23, 24 and 25. The several bars just disclosed, secured together as their position makes necessary, constituting the corner post A.

The side post B is made up of four channel bars 26, 27, 28 and 29.

The end post C is preferably made up of channel bars 30, 31, 32, 33, 34 and 35, arranged in two groups of three each as indicated at Figure 8.

The interior posts D are preferably made up of four channel bars 36, 37, 38 and 39.

Extending upwardly from the channel bars 23, 24, 28, 29, 30, 35, 36, 37, 38 and 39 are arched channel bars 40 and 41 connected or joined by a pipe or tube preferably square and indicated at 42 (see Figure 4).

The channel bars 21 and 27 are arranged in alignment, spaced apart to receive and permit sliding movement of the shutter units 43 forming the side walls of the structure. The channels 25 and 31 are also in alignment, providing for the sliding movement of the shutter units 44, being the lower group of units of the end wall. The channels 24 and 32 are also in alignment, providing for the sliding movement of the shutter units 45 which form the upper group of units of the end wall, shutter unit 46 remaining practically stationary and the other units nesting relative thereto.

The interior posts D do not make any provision for accommodating sliding shutters, as the interior of the entire building is open, but said posts D support arches E and the shutter units carried by such arch members. For instance, each of the interior posts D carries two of the structures shown at Figure 4, each consisting of the two channels 40 and 41 and the squared tube 42, and said channels arranged in alignment to accommodate the group shutter units 47 which nest downwardly in opposite directions from their meeting lines 48 (see Figures 1 and 3), and into the tops of the channels of the several posts A, B, C and D, as indicated more particularly in Figures 9 and 10, such figures representing not only the posts B and D as indicated, but also in like manner the posts A and C.

The several posts are provided each with a strengthening and spacing block 49, which is secured thereto in any approved manner adjacent the beginning of the arch, whereby the several structural units of the several posts are maintained in proper alignment at their upper ends. The said post units are also held in their proper positions, and separated, along the ground by means of concrete or other buried block structures 50.

The shutter unit groups 44 and 45, of the end, are connected together by means of cables 51 whereby the raising of the bottom group lowers the top group until all of said units are nested in relation to the practically stationary unit 46.

The side shutter units 43 are likewise connected by cables 52 with the arch shutter units 47 so that the raising of the shutter units 43 will lower the arch shutter units 47. It is obvious of course that the reverse movement of the parts will result from the movement of either of said groups of shutter units.

The interior arch shutter units, however, have no shutters beneath to serve as to counter weights, and it is necessary to supply counter weights for balancing, or approximately balancing, the interior arch shutter units. For this purpose counter weights 53 are employed wherever it is found necessary to balance, or approximately balance, the weight of sliding units not compensated for by co-acting units. These weights 53 may be placed in any position where it is found desirable. As shown at Figure 6 they are provided to slide upon tracks 54 and are connected by means of cables 55 with the arch shutter units, in any approved manner as by passing over the pulleys 56 (see Figure 3), and attaching to pins or the like 57 in the shutter units 47.

As will be noted, especially from Figure 2, the structure is such that moisture precipitated upon the arch shutter sections 47 will be discharged into the interior of the structure unless some provision for carrying away such moisture is provided. For this purpose a gutter 58 is provided extending over the several posts D, as indicated more particularly at Figures 2 and 10, and a gutter also provided at 59 (see Figure 9) for caring for the moisture precipitated from the arch sections within the lines of the building.

The structure just above described is a complete organization, and will enclose plants or trees indicated at 60 and will protect them from frost or the like under ordinary conditions. It is desirable, however, to not only enclose such trees or plants, but to do so expeditiously, and, when enclosed, to supply heat within the structure if the temperature makes such heating necessary. For the purpose of expeditiously closing the structure and supplying heat, a combination of heating element and closing mechanism has been provided. This comprises a plurality of pipes 61 extending longitudinally of the structure, between the several sections and at the sides and movable vertically between the structural units of the several posts. The pipes receive steam or other heating fluid in any approved manner as by the swivel connection 62, through a reflexible pipe 63, from a feeder pipe 64, which may be buried in the ground, so that when the parts are raised it will offer no obstruction to ingress and egress.

The pipes 61 are provided with pinions 65 at each of the posts, or at as great a number of posts as may be found desirable, such pinions to engage racks 66, whereby, when the pipe 61 is rotated, the pinions 65, through their engagement with the racks 66, will cause the pipes to move upwardly along the posts. For rotating the pipes 61 any approved means may be provided, as the flexible shaft 67 driven from any available portable power. As it is necessary that the extremities of the pipes be available to apply the flexible shaft thereto and at the same time it being desirable to close the structure, doors 68 are provided, which normally close over the extremity of the pipe 61, but may be opened as indicated at Figure 7, to permit the connection of the flexible shaft 67 therewith.

When the pipes 61 have been raised to the desired altitude the pinions 65 are engaged by a detent 69 (see Figure 12) which prevent rotation of the pinions and therefore hold the pipes 61 in such elevated position. The detent 69 is preferably electrically controlled, a magnet 70 being provided to attract the armature 71, on the detent 69, energized by a battery 72 and the circuit closed by a switch 73. It is obvious that as many of the detents 69 as may be found desirable may be included in the same circuit so that the closing of a single switch will release all of the pipes 61 which have been raised.

The pipes 61 are journaled to rotate in blocks 74, which blocks may be of any shape made necessary by the arrangement of the units of the posts in which such blocks slide. The blocks 74 serve not only as journals for pipes 61 but also, being constructed of metal, add materially to the weight of the pipes. As has been said, it is desirable that the releasing of the pipes 61 shall serve to close the shutters. For this purpose the blocks 74 are provided with such form of arms as may be necessary, indicated at 75 in Figure 6 to engage upon the weights 55, or of the form indicated at 76 in Figure 8 to engage upon brackets 77 on the shutter units 44, or the arm 78 as shown at Figure 7 to engage upon the brackets 79 of the shutter units 44 and the bracket 80 of the shutter units 43, or the arms 81 as shown at Figure 5 to engage upon the brackets 82 of the shutter units 43.

The engagement of the block 74 upon the weights 53 causes the weights 53, by reason of the weight added thereto, to overbalance the shutter units 47 connected with the cables 55 and to close the arch sections. The engagement with the end shutter units, as shown at Figures 7 and 8, close the end shutters while the engagement with the side shutter units, as shown at Figures 5 and 7, will close the side shutter units and the outer arch shutters. When a cold wave is impending, it is obvious therefore that by closing the switch 73 all of the various mechanisms are released necessary to simultaneously and almost instantaneously close the shutters to completely enclose the sheltering structure. Admitting heated fluid as for instance, steam through the feeder pipe 64 and through the flexible pipes 63 into the several pipes 61 will serve to maintain the temperature within the structure at whatever point above freezing may be found desirable.

It is obvious that when the structure is opened and the pipes 61 and their weighted blocks 74 are in raised position, the several sections may be closed manually and independently. This is desirable in that normally the structure will remain open practically all of the time, and will be closed only for a short period, or short periods, at long intervals. It is desirable therefore that the mechanism be tested and kept in working order, and this is accomplished manually by manipulating the sections independently of each other, so that each section may be given proper attention and repaired to put it in working order as it may be found inoperative.

In operation the several shutter units will be nested, throughout the entire organization, at or little below the beginning of the arch bars, and will therefore offer little obstruction to the passage of light air or operators. The several units will remain normally in that position until it is necessary to enclose the plants or trees for protection. When this necessity arises, the switch 73 is closed, thereby releasing the several weights, constituted in part of the heating pipes 61, which will, by their own weight fall, overcoming the inertia of the shutters and close all of the sections of the entire structure simultaneously. The heating may now be accomplished as may be found desirable by introducing heated fluid into the pipes 64, and through the flexible pipes 63 into the rotating pipes 61.

When the danger of freezing has passed, the pipes 61 may be raised each independently by attaching to one or both ends of the same, some means for rotating, as for instance the flexible shaft 67 driven from any approved source of portable power. When all of the pipes 61 have been raised, or as fast as they are raised, the shutter sections may be manipulated to open position which as before explained is nesting adjacent to the lower extremities of the arches.

Having thus fully described my said invention, what I claim as new and desire to secure by Letters Patent, is:

1. A vegetation protecting structure comprising, spaced uprights, shutter sections slidable in the uprights, arches connecting the uprights, other shutter sections slidable in the arches, said groups of sections being adapted to nest at a common position.

2. A vegetation protecting structure comprising, spaced uprights, shutter sections slidable in the uprights, arches connecting the uprights, other shutter sections slidable in the arches, said groups of sections being adapted to nest at a common position, and means to simultaneously move the shutters to closed position.

3. A vegetation protecting structure comprising a plurality of vertical walls composed of slidable units, a plurality of roof sections comprising a plurality of connecting slidable units, means to simultaneously or independently slide the units of the wall and the roof sections.

4. A vegetation protecting structure comprising, spaced uprights, shutter sections slidable in the uprights, arches connecting the uprights, other shutter sections in the arches, means to simultaneously or independently slide sections of the uprights and the arches to a common nesting position.

5. In a vegetation protecting structure spaced uprights, arched ways connecting the spaced uprights, shutter units mounted to slide in the ways, counter weights slidable in the spaced uprights and flexible connecting members connecting the counter weights with the shutter units.

6. A vegetation protecting structure comprising a plurality of spaced uprights, arched ways connecting some of the uprights and presenting registering channels, shutter sections extending between adjacent arches and slidable in the ways, counter weights slidable in the uprights, and flexible connecting members connecting the shutter sections and counter weights.

7. A vegetation protecting structure comprising side walls and roof, sections constructed of slidable units, heating pipes located within the structure and adapted to be raised and lowered, and means connecting the heating pipes with the sections whereby the descent of the heating pipes causes a closing movement of the sections.

8. A vegetation protecting structure embodying side walls and roof sections comprising sliding shutter units, means connecting the side wall units with the roof units whereby the units move in unison, heating pipes disposed within the structure adapted to be raised and lowered, and means connecting the heating pipes with the shutter units whereby the descent of the heating pipe causes a closing movement of the shutter units.

9. A vegetation protecting structure comprising spaced uprights, side wall shutter units slidable in the uprights, arched roof members connecting the uprights, shutter units slidable in the arched members, heating pipes disposed within the structure and adapted to be raised and lowered within the uprights, means adapted to retain the heating pipes in raised position, means to release the heating pipes and permit their descent, and means connecting the heating pipes with and to close the shutter units when descending.

10. A vegetation protecting structure comprising spaced uprights, side wall shutter units slidable in some of the uprights, arched roof members connecting some of the uprights, roof shutter units slidable in the arched roof members, weights slidable in the uprights, means connecting the weights and the shutter sections whereby the descent of the weights closes the shutter sections, means to simultaneously raise the weights, means to retain the weights in such raised position, and means to release the retaining means.

11. A vegetation protecting structure comprising side walls composed of slidable shutter sections, a roof composed of sections each comprising a plurality of slidable shutter sections, weights disposed within the structure, means to simultaneously raise a plurality of the weights, means to retain the weights in raised position, means for releasing the weight, and means connecting the weights with the shutter sections whereby the descent of the weights closes the shutter sections.

12. A vegetation protecting structure comprising a plurality of spaced uprights, walls carried by some of said uprights comprising vertically slidable shutter units, arches supported by said uprights, shutter units slidable in the arches, means whereby the shutter units of the arches and the uprights nest in a common position, weights slidable vertically in some of the uprights, means to raise a plurality of said weights simultaneously, means to retain the weights in raised position, means to release the weights from raised position, and flexible members connecting the weights and shutter units whereby the descent of the weights closes the shutter units.

13. A vegetation protecting structure comprising a plurality of spaced uprights, side walls supported by some of said uprights comprising vertically movable shutter units, arches supported by and connecting some of said uprights, roof sections carried by said arches comprising slidable shutter units, means whereby the shutter units of the side walls and the arches nest at a common position, weights slidable relative to some of said uprights, racks carried by some of said uprights, a rotatable member connected with the weights and provided with pinions engaging the racks, means to rotate the rotatable member to raise the weights by engagement of the pinions with the racks, means to engage the pinions, to retain the rotating member and weights in elevated position, and flexible members connecting the weights with the shutter sections whereby the descent of the weights closes the shutter sections.

In witness whereof, I have hereunto set my hand and seal at Washington, D. C., this eleventh day of November, A. D. nineteen hundred and nineteen.

FRANK H. CARROLL. [L. S.]

Witness:
E. W. BRADFORD.